Figure 1:
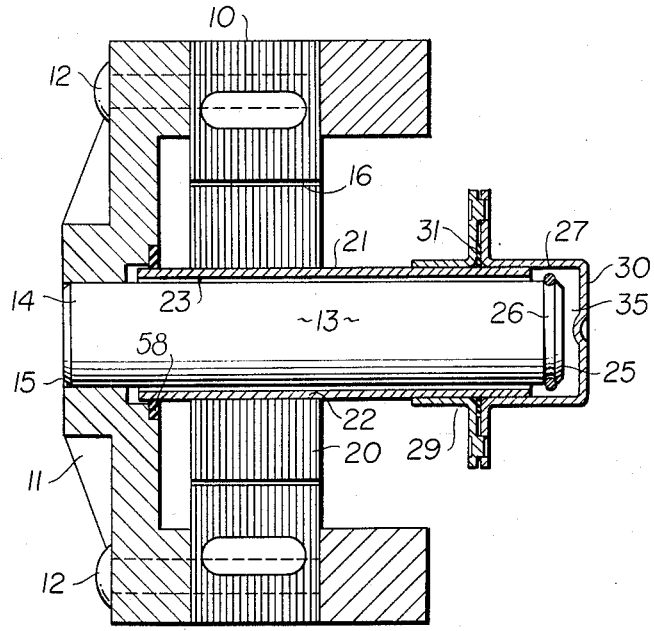

March 15, 1960     E. F. MACKS     2,928,960
DYNAMOELECTRIC DEVICE
Filed Dec. 4, 1957

INVENTOR.
ELMER FRED MACKS
BY *Pyle & Fisher*
ATTORNEYS

# United States Patent Office 2,928,960
Patented Mar. 15, 1960

2,928,960
DYNAMOELECTRIC DEVICE

Elmer Fred Macks, Vermilion, Ohio, assignor, by direct and mesne assignments, to Air-Glide, Inc., Cleveland, Ohio, a corporation Application December 4, 1957, Serial No. 700,651

9 Claims. (Cl. 310—90)

This invention relates to dynamoelectric machines and more particularly to a mechanism for absorption of transient axial thrust loads in a dynamoelectric device having a rotor supported on a pneumodynamic gas film.

United States patent application Serial No. 558,676, filed January 12, 1956, bearing the title Dynamoelectric Device, now abandoned in favor of the continuation-in-part application, Serial Number 714,454, filed January 28, 1958, discloses the broad and basic concepts relating to a dynamoelectric device wherein the rotor is totally supported radially on a film of fluid, which film is preferably an air film generated upon relative rotation of the rotor and the stator. In the referenced patent application and related applications, various mechanisms have been provided to absorb end thrust load and to provide axial location of the rotor during shut-down.

During operation of one of these dynamoelectric machines, the rotor may be located axially in the stator by the magnetic field when thrust loads are not excessive. When the motor is turned off and the rotor is allowed to coast to a stop, however, some mechanism is necessary to prevent undue axial relative movement between the rotor and stator, and additionally a thrust mechanism may be necessary to absorb transient thrust loads when the device is in operation.

One of the principal objects of this invention, therefore, is to provide a novel and improved mechanism for use in a dynamoelectric device, having a rotor radially supported on a pneumodynamic film in which axial stability of the relatively rotatable elements is provided in the form of a trapped gas cavity at one end of a pneumodynamic radial bearing.

Another principal object of this invention is to provide a mechanism having non contacting rotor and stator elements which comprises a thrust cavity in communication with the ambient atmosphere through a pneumodynamic radial-load-carrying-gas-film-producing-region for the relatively rotating members, the very small radial clearance and extreme precision of which inherently limits leakage and the ingress and egress of gas to and from the thrust cavity, thereby providing thrust absorption and axial stability for the relatively moving members, even when transient axial loads obtain.

Another principal object of this invention is to provide a dynamoelectrical device with the rotor supported on a pneumodynamic film in which a very inexpensive and simple axial stability producing mechanism for the relatively moving surfaces is obtained by sealing one end of the pneumodynamic load-carrying, film-producing region thus providing a gas pocket which inherently limits axial position without contact even when transient axial loads exist and no lubricant other than gas is present.

A further object of this invention is to embody the above mentioned features for operation with the axis of rotation either horizontal or vertical in any class of dynamoelectric equipment such as motors, generators, converters and combinations thereof, such as motor-generator sets and turbine-generator sets.

A further object of this invention is to provide for the subject class of dynamoelectric equipment a non-contacting and silent combination radial and axial support means which functions at all times when there is relative rotation of the rotor and stator.

A further object of this invention is to provide a dynamoelectric machine which will absorb unbalanced transient loads in order that the need for balancing of the rotor and connected parts, such as impeller blades, is substantially reduced to the point of complete elimination in many applications.

Figure 2:
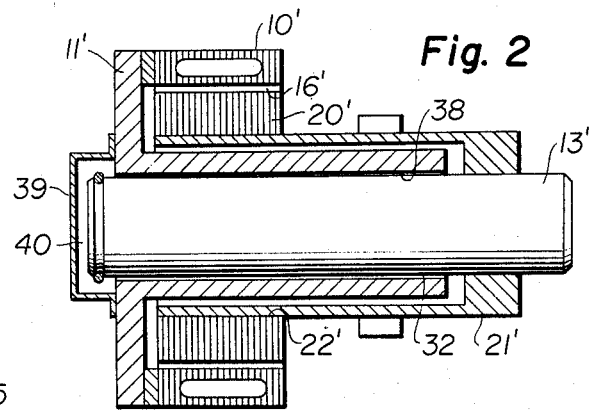
Figure 3:
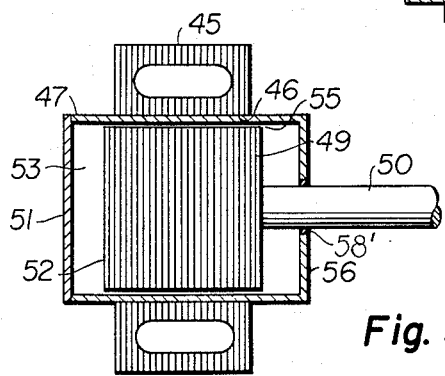

These listed objects will outline the invention, but other objects and a fuller understanding of the invention may be had by referring to the following description and claims, taken in conjunction with the accompanying drawings, in which:

Figure 1 is a sectional view of an induction motor which incorporates the improved thrust resisting mechanism and in which a pin carried by the stator cantilever fashion supports the rotor through a radial load carrying gas film developed between the pin and a sleeve carried by the rotor;

Figure 2 is a modified form of the device shown in Figure 1 embodying the principles disclosed therein and in which the radial load carrying gas film is formed between the periphery of a pin supported by the rotor and the bore of a sleeve supported by the stator; and, Figure 3 is a modified form of the devices shown in Figures 1 and 2 embodying the principles disclosed therein and in which the radial load carrying gas film is formed between the periphery of the rotor and bore of the stator.

In the drawings, an induction motor is shown in Figure 1 which incorporates the principles of this invention and discloses these principles in one environment. A magnetic field inducing laminated body 10 is provided which body forms a major portion of the stator. The stator also includes a bracket 11 which is fixed to the field as by rivets 12 and a pin 13 carried cantilever fashion by the bracket 11. Preferably, the pin 13 has an end portion 14 which is press fit into an aperture 15 in the bracket 11.

The field has a through, generally cylindrical bore 16. The pin 13 and the bore 16 are substantially coaxial. An armature 20 is also located coaxially in the bore 16. The armature 20 has a press fit sleeve 21 snugly held in armature bore 22. The periphery of the pin 13 and the inner surface of the sleeve 21 form smooth cylindrically contoured surfaces which generate a load carrying gas film in the region designated by the numeral 23. This region 23 has a radial clearance of from 0.000050 inch per inch of diameter to 0.0003 inch per inch of diameter.

For satisfactory overall performance the out-of-round tolerances of the pin and sleeve are held within 0.0001 inch per inch of diameter and taper is held within one-half the radial clearance. The gas film generated in the region 23 totally supports all rotating elements of the rotor in a manner which is more completely described in the above referenced copending patent application.

A groove 26 is formed in the pin 13 adjacent to outer or remote end 25. A snap ring 27 is carried in the groove. The ring 27 serves to prevent removal of the sleeve 21 from the pin 13. A flanged cap support 29 is fixed to the periphery of the sleeve 21. Preferably the cap support 29 is connected in a fluid tight fashion to the sleeve 21. A flanged cap 30 is telescoped over the end of the sleeve 21 and the flanges of the cap support 29 and cap 30 are fastened together in a gas tight fashion. A gasket 31 may be interposed between the flanges to assure gas tight integrity. The armature 20, sleeve 21, cap support 29, cap 30 and gasket 31 together define the motor rotor. The cap 30 forms end closure means which together with the end 25 of the pin 30 define a cavity 35.

The cavity 35 is one of the outstanding features of this invention and it provides many novel and unexpected results. A quantity of air is trapped in the cavity. Even when the rotor is at rest the radial clearance of the region 23 is so slight that relative axial movement of the rotor and stator is resisted. When the device is in operation the pneumodynamic film in the region 23 further retards movement of air through this region. If a force attempts to shift the rotor relatively to the left as seen in Figure 1, the air trapped in the cavity 35 resists this movement because the movement tends to pressurize the air. Movement to the right is also inhibited due to a partial vacuum in the cavity 35 created by such motion. Thus, this simple construction provides a thrust cushion which limits relative axial movement of the armature in either direction along the axis of the stator. This thrust cushion coupled with the cushioning effect of the radial load carrying gas film in the region 23 provides total load support in all directions on a cushioning film of gas so that limited out-of-balance conditions are inherently absorbed. The construction is such that no precise tolerances are required other than those in the gas film region 23.

The embodiment shown in Figure 1 demonstrates the extreme flexibility of this motor. The drawing of Figure 1 has been produced from production drawings of a motor designed for the continuous circulation of air in modern home refrigerators and freezers. In this application a squirrel cage blower is mounted on the end cap 30 and fixed to the flange 29, and the motor rotates about a horizontal axis. The magnetic field is utilized to locate the rotor, and the thrust cavity serves to absorb transient thrust loads and all axial loads when the motor coasts to a stop.

As an indication of the versatility of this construction, it will work equally well with a vertical axis of rotation such as in a vacuum sweeper. There again the magnetic field is used to "locate" the rotor in the stator, axially speaking, and the air cavity serves to dampen transient loads and hold the rotor and stator in spaced relationship when the rotor is coasting.

In addition, the induction motor of Figure 1 is usable in many applications and it has distinct advantages over conventional motors in the same class. Certain of these advantages are wholly unexpected and are a result of the invention disclosed herein. For example: In a motor which has the rotor supported on a radial pneumodynamic bearing and which is not equipped with a thrust mechanism as taught here, when the current is turned off the rotating assembly immediately floats to one end and chatters against an end stop until the unit coasts to a standstill. This causes objectionable noise and wear. During operation, when a motor is supported on either a radial pneumodynamic bearing, plain bearing or "oilite" bearing, the rotor is often times caused to flutter axially, making axial location indefinite and causing objectionable noise and instability. Such a "free-floating" rotor in a dynamoelectric machine causes considerable chatter and clanking noise when the unit is disturbed axially, as, for example, if a motor is mounted in an automobile door or in a refrigerator door which is continually opened and closed. This problem is handled in certain cases by forcing the rotor to one end, causing "thrusting" against a stop. Such design which is commonly practiced results in constant contact, increased noise and reduced life and reliability.

This invention allows a "full-floating" rotor in a dynamoelectric machine while inherently providing means to absorb transient axial loads and limit axial displacement caused thereby, all without intimate contact between the relatively moving surfaces and without a lubricant other than ambient gas.

Additional practical and unexpected results include the following examples:

(1) A dynamoelectric machine with a "free-floating" rotor mounted in a horizontal position may operate without the need for causing the rotor to "thrust" and without the need for contacting end stops or complicated thrust bearings. Such motors may be used for many classes of air circulation, as, for example, when driving squirrel cage blowers. The principles may also be embodied in generators or motor-generator sets and in other applications where the device delivers a direct torque load, the rotor of which is occasionally subjected to transient axial loads as might be caused by inertia affects, magnetic disturbances and shut-down.

(2) Axial instability and noise is present in fan-motor units employing conventional "full-floating" rotors. Such instability and noise is caused by many factors such as, (a) blade contour not being identical from blade to blade in a given fan, (b) magnetic disturbances, and (c) inertia loadings if the unit is located in a moving object. Furthermore, when the current is shut off the aerodynamic thrust obtaining as the unit coasts to a shut-down causes the rotating assembly to chatter against the axial stop. However, in the present invention all such transient axial loads and disturbances are accommodated by the thrust cavity which provides axial stability without contact and without noise, even though ambient gas is the only lubricant.

Laboratory samples of motors incorporating the embodiments of the present invention are presently being manufactured and are being evaluated for such long-life, maintenance-free applications as internal refrigerator air circulation where the motor is mounted in either the back wall of the refrigerator or in the swinging door. In this case the motor drives a squirrel cage centrifugal blower. The centrifugal squirrel cage blower is approximately three inches in diameter and one inch long and is nylon injection molded. A ten watt input shaded 2-pole motor (Model G–410–B) is suitable for this purpose. The pin diameter is 0.42500 inch. The effective length of the pneumodynamic bearing is 1⅜ inch. The diametrical clearance between the pin periphery and the rotor bore is 0.0002 inch with taper and out-of-round tolerances of plus or minus 0.000025 inch. Both the pin and the sleeve have a surface finish within 5 micro inches. A sealed thrust cavity is provided which is in communication with the atmosphere only through the foregoing mentioned radial pneumodynamic bearing. The integral motor-blower operates at a speed of 3000 r.p.m. in free air.

This unit exhibits several remarkable results for a free-running motor. With a ten degree tilt there is less than 0.040 inch axial displacement per minute during coast to a stop. The entire assembly may be mounted in a refrigerator door and the door opened and closed without noise when the motor is either running, coasting to a stop, or at a stand-still. The combined effect of the radial load carrying film and the thrust cavity is such that balancing of the rotor and blower is generally not required.

Another example also in the refrigeration industry is a long-life, maintenance-free motor-fan combination which is located underneath the refrigerator and is used for the forced circulation of air over the condenser for "built-in" refrigeration units. The motor configuration employed here is identical to that used in the foregoing blower example except for a 20 watt input, a 0.0002 inch diametral clearance, and an effective bearing length of approximately two inches. In this case the motor drives an integral five bladed propeller fan of seven inch diameter and 31 degree pitch. The integral motor-fan unit operates at a speed of 880 r.p.m. Due to the invention described herein this unit can operate on either continuous duty or intermittent duty, whereby it is cycled with the compressor unit. Furthermore, cheaper blades can be employed inasmuch as static balance and individual blade contour need not be checked. In each case the axial stability provided by the thrust cavity reduces noise and vibration and makes it possible to employ a completely non-contacting and maintenance-free unit, even though ambient air is the only lubricant.

As a striking example of the simplicity and low cost inherent in mechanisms made in accordance with this teaching even for high-speed applications requiring axial stability, motors identical to those just described except for high frequency windings and a diametral clearance of 0.0003 inch for the pneumodynamic radial bearing region have been operated successfully at speeds up to 16,600 r.p.m. with ambient air as the only lubricant—and without rotor balance. After current shut-off the rotor coasts for over 3½ min. when tilted 5° with the horizontal. The rotor is supported axially only by the thrust cavity. During operation the unit is completely stable axially even though a "full-floating" rotor is employed.

This unit is designed for synthetic textile fibre processing wherein the end cap 30 of Figure 1 is made in the form of a pulley to drive continuous fibres. Axial location and uninterrupted service are prime requisites in order to eliminate thread breakage and maintain high production. The thrust cavity 35 described herein makes this application possible in that axial stability and axial location are inherently provided at low cost even for continuous high-speed operation and without need for maintenance—with ambient air as the only lubricant.

In Figure 2 the bracket 11' includes an inward extension 37 which passes through the bore 16' of the stator and the bore 22' of the rotor. The sleeve 21' carries a pin 13' which is fastened to it as by a press connection.

The extension 37 has a through bore defined by an inner surface 38. The inner surface 38 and the periphery of the pin 13' together define the radial load carrying fluid film producing region 23'. A gas tight end closure 39 is fixed to the bracket 11' to define gas cavity 40 which functions in a manner identical to the cavity 35.

In Figure 3 the field is designated by the numeral 45. The field 45 has a through bore 46 in which a non-magnetic sleeve 47 may be carried. The field 45 and the sleeve 47 together define the stator of the motor of Figure 3 while the rotor comprises simply an armature 49 and a shaft 50.

The sleeve 47 includes a gas tight end closing section 51. The sleeve 47 including the end section 51 together with end 52 of the armature 49 defines a cavity 53 which is identical in purpose and function to the cavities 35, 40. The radial load carrying gas film producing region in the motor of Figure 3 is around the periphery of the armature 49 and designated by the numeral 55. An end closure cap 56 may be provided to serve primarily as a dirt shield. The end closure cap 56 is fixed to the sleeve 47.

Seal means may be provided at region 58 in Figures 1 and 3 to prevent ingress of contaminants into the radial load carrying fluid film producing regions.

While the invention has been described with a great deal of detail, it essentially comprises a device wherein relatively rotatable rotor and stator elements of a dynamoelectric device define an internal cavity, which cavity forms a non-contacting thrust cushion against relative axial movement of the elements caused by transient axial loads by trapping a quantity of fluid in the cavity, and in which communication of the cavity with the ambient fluid is through a radial load carrying fluid film region.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A dynamoelectric machine comprising, rotor and stator elements, each of said elements having a smooth cylindrically contoured surface, the surfaces being telescoped together, the surfaces being closely spaced and complemental, the surfaces also being substantially coaxial and defining a load carrying fluid film producing region therebetween, said surfaces coacting to develop a radial load carrying film of fluid when the device is in operation, each of said surfaces having first and second ends, one of said elements including means to hermetically seal the first end of one of the surfaces, the other of the elements having a first end wall at the first end of the other of the surfaces axially spaced from said means, said one element including said means and said other element first end wall together defining a thrust cavity, and relative axial displacement of the elements being limited by a quantity of fluid trapped in said cavity.

2. A dynamoelectric machine comprising, rotor and stator elements, each of said elements having a smooth cylindrically contoured surface, the surfaces being telescoped together, the surfaces being closely spaced and complemental, the surfaces also being substantially coaxial and defining a load carrying fluid film producing region therebetween, said surfaces coacting to develop a radial load carrying film of fluid when the device is in operation, each of said surfaces having first and second ends, one of said elements including means to hermetically seal the first end of one of the surfaces, the other of the elements having a first end wall at the first end of the other of the surfaces axially spaced from said means, said one element including said means and said other element first end wall together defining a thrust cavity, and relative axial displacement of the elements being limited by a quantity of fluid trapped in said cavity, the ingress and egress of fluid into said cavity being inherently regulated by the radial load carrying fluid film region.

3. A dynamoelectric device comprising, a stator element having means to induce a magnetic field, the stator having a bore therethrough, a bracket fixed to the stator, a pin having a first end portion and a second end wall, the pin first end portion being fixed to the bracket, the pin being longitudinally disposed in the stator bore and coaxial therewith, the pin having a smooth cylindrically contoured outer surface, a rotor element rotatable in response to magnetism produced in said field, the rotor having an axial bore, the rotor being carried in the stator bore and relatively rotatable therewith, the rotor having a smooth cylindrically contoured inner surface defining the rotor bore, the rotor bore having first and second ends, the rotor including means to hermetically seal the second rotor bore end, the pin projecting through the rotor bore first end and being disposed in part of the rotor bore in substantially coaxial relationship, said surfaces together defining a load carrying fluid film producing region, said surfaces coacting to generate a radial load carrying fluid film upon relative rotation, said rotor being totally supported on a film of fluid when the elements are rotating relatively, and said rotor including said hermetic sealing means and said pin second end wall together defining a thrust cavity, said cavity containing a quantity of fluid for limiting relative axial movement of the elements, and said load carrying film serving to inhibit the ingress and egress of fluid to and from the cavity.

4. In a dynamoelectric device having rotor and stator elements including means to induce a magnetic field, the improvement which comprises, one of said elements having a bore therethrough, the other of said elements being disposed in the bore, and a sleeve carried by said one element in said bore, the sleeve having first and second ends, the sleeve including means to hermetically seal said first end, said sleeve also having a smooth cylindrically contoured inner surface, said sleeve surface and said other element being coaxial, said other element having an end wall, said sealing means, said sleeve surface, and said other element end wall together defining a thrust cavity, said other element having a smooth cylindrically contoured outer surface, said surfaces being complemental and closely spaced, said surfaces together defining a fluid dynamic load carrying film producing region when the device is in operation, said cavity being in communication with said region and otherwise closed, and said rotor element being totally supported radially by such fluid film and totally supported axially by the combination of said magnetic field, said thrust cavity when the current is on, and said rotor element being totally supported axially by the cavity when the current is off.

5. A dynamoelectric machine comprising, rotor and stator elements, each of said elements having a smooth cylindrically contoured surface, the surfaces being telescoped together, the surfaces being closely spaced and complemental, the surfaces also being substantially coaxial and defining a load carrying gas film producing region therebetween, said surfaces coacting to develop a radial load carrying film of gas when the device is in operation, each of said surfaces having first and second ends, one of said elements including means to hermetically seal the first end of one of the surfaces, the other of the elements having a first end wall at the first end of the other of the surfaces axially spaced from said means, said one element including said means and said other element first end wall together defining a thrust cavity, and relative axial displacement of the elements being limited by a quantity of gas trapped in said cavity, said gas being supplied by the ambient atmosphere.

6. A dynamoelectric machine comprising, rotor and stator elements, each of said elements having a smooth cylindrically contoured surface, the surfaces being telescoped together, the surfaces being closely spaced and complemental, the surfaces also being substantially coaxial and defining a load carrying gas film producing region therebetween, said surfaces coacting to develop a radial load carrying film of gas when the device is in operation, each of said surfaces having first and second ends, one of said elements including means to hermetically seal the first end of one of the surfaces, the other of the elements having a first end wall at the first end of the other of the surfaces axially spaced from said means, said one element including said means and said other element first end wall together defining a thrust cavity, and relative axial displacement of the elements being limited by a quantity of gas trapped in said cavity, said gas being supplied by the ambient atmosphere, and said region having an average radial dimension of from 0.000050 to 0.0003 inch per inch of diameter; and each of said surfaces having an out of round tolerance not in excess of 0.0001 inch per inch of diameter, a taper not in excess of the average radial clearance per inch of diameter, and a surface finish within 5 micro-inches for both of said surfaces.

7. A dynamoelectric device comprising, a stator including means to induce a magnetic field, the stator having a bore therethrough, a bracket fixed to and forming part of the stator, the bracket having an elongated tubular projection extending coaxially through the stator bore, the projection having first and second open ends, an armature projecting into the stator bore and surrounding the projection, the armature having an elongated axially disposed pin projecting through the projection bore from the first to the second end, the pin and projection together defining a radial load carrying film producing region, and said stator including means to seal said projection second end, said stator including said sealing means and an end of said pin together defining a thrust cavity.

8. A dynamoelectric device comprising, a stator element having means to induce a magnetic field, the stator having a bore therethrough, a bracket fixed to the stator, a pin having a first end portion and a second end wall, the pin first end portion being fixed to the bracket, the pin being longitudinally disposed in the stator bore and coaxial therewith, the pin having a smooth cylindrically contoured outer surface, a rotor element rotatable in response to magnetism produced in said field, the rotor having an axial bore, the rotor being carried in the stator bore and relatively rotatable therewith, a sleeve carried in and forming a part of the rotor bore, the sleeve having an inner surface defining a through bore, the sleeve bore having first and second ends, the rotor including means to seal the sleeve second end, the pin projecting through the bore first end and being disposed in part in the sleeve in substantially coaxial relationship, said surfaces together defining a load carrying fluid film producing region, said surfaces coacting to generate a radial load carrying fluid film upon relative rotation, said rotor being totally supported on a film of fluid when the elements are rotating relatively, and said rotor including said hermetic sealing means and said pin second end wall together defining a thrust cavity, said cavity containing a quantity of fluid for limiting relative axial movement of the elements, and said load carrying film serving to inhibit the ingress and egress of fluid to and from the cavity.

9. A dynamoelectric machine comprising, a stator having a through bore and including means to induce a magnetic field, a cylindrically tubular sleeve positioned in the bore, said sleeve having first and second ends, means closing and hermetically sealing said sleeve first end, a rotor carried in the sleeve, said rotor having a cylindrically contoured external surface, the sleeve having a cylindrically contoured internal surface, said surfaces being complemental and spaced to provide a load carrying fluid dynamic film producing region therebetween, said rotor having a shaft fixed thereto and projecting longitudinally past one of the sleeve ends, said rotor being totally supported on a film of fluid generated in said region when the device is in operation, the fluid in said region being supplied by the fluid ambient to the machine, and said rotor having an end wall spaced from said hermetic sealing means to provide a thrust cavity therebetween, said thrust cavity having a trapped quantity of fluid contained therein, said fluid being under positive pressure with respect to the pressure of the ambient fluid when the rotor shifts axially relative to the stator in one direction and being under negative pressure with respect to the pressure of the ambient fluid when the rotor shifts axially relative to the stator in the other direction when the device is in operation.

References Cited in the file of this patent

UNITED STATES PATENTS

| | | |
|---|---|---|
| 2,234,571 | McCormack | Mar. 11, 1941 |
| 2,756,115 | Michel | July 24, 1956 |
| 2,766,695 | Gailloud | Oct. 16, 1956 |

FOREIGN PATENTS

| | | |
|---|---|---|
| 129,404 | Sweden | Sept. 12, 1950 |